United States Patent [19]

Takamizawa et al.

[11] Patent Number: 4,567,245

[45] Date of Patent: Jan. 28, 1986

[54] SUBSTITUTED POLYACETYLENE COPOLYMER

[75] Inventors: Minoru Takamizawa; Akira Yamamoto; Shigehiro Nagura, all of Niigata, Japan

[73] Assignee: Shin-Etsu Chemical Co., Ltd., Tokyo, Japan

[21] Appl. No.: 681,861

[22] Filed: Dec. 14, 1984

[30] Foreign Application Priority Data

Dec. 22, 1983 [JP] Japan ................................. 58-243609

[51] Int. Cl.$^4$ ..................... C08F 230/08; C08F 238/00
[52] U.S. Cl. .................................................... 526/279
[58] Field of Search ......................................... 526/279

[56] References Cited

U.S. PATENT DOCUMENTS 2,671,101 3/1954 Frisch et al. ........................ 526/279
2,671,795 3/1954 Frisch et al. ........................ 526/279

*Primary Examiner*—Harry Wong, Jr.
*Attorney, Agent, or Firm*—Toren, McGeady, Stanger, Goldberg & Kiel

[57] ABSTRACT

The invention provides a novel substituted polyacetylene copolymer having an outstandingly large oxygen permeation coefficient of $6 \times 10^{-8}$ cm$^3$(STP)·cm/cm$^2$·sec·cmHg or larger and a separation factor between oxygen and nitrogen of 2.0 or larger along with a high tensile strength of 200 kg/cm$^2$ or larger in the form of a film and useful as a gas permeation element in the separation or enrichment of oxygen from or in air. The copolymer is obtained by the copolymerization of 1-trimethylsilyl-1-propyne and 1-(1',1',3',3'-tetramethyl-1',3'-disilabutyl)-1-propyne in a molar ratio of 30:70 to 95:5 and the copolymer should preferably have a number-average molecular weight of at least $1 \times 10^4$.

2 Claims, 2 Drawing Figures

SUBSTITUTED POLYACETYLENE COPOLYMER

BACKGROUND OF THE INVENTION

The present invention relates to a novel substituted polyacetylene copolymer or, more particularly, to a film-forming substituted polyacetylene copolymer having a remarkably large permeability to oxygen gas.

It is well known that organosilicon polymers in general have a relatively large gas permeability coefficient as a polymeric material. For example, organopolysiloxanes, i.e. silicones, have an oxygen permeability coefficient as large as about $3.5 \times 10^{-10}$ cm$^3$(STP)·cm/cm$^2$·sec·cmHg. Silicone polymers are, however, not satisfactory as an oxygen permeable polymeric material due to the low mechanical strength thereof which is a limiting factor against decrease of the thickness of the films shaped thereof.

Various kinds of copolymers based on an organopolysiloxane have been proposed with an object to improve the mechanical strength of silicone including, for example, copolymers of an organopolysiloxane with polycarbonate, polystyrene and others. The increased mechanical strength in these copolymeric materials is, however, obtained only with sacrifice of the oxygen permeability coefficient so that oxygen permeable elements made of these copolymers are usually prepared with inconveniences by supporting an extremely thin membrane of the copolymer on a porous carrier film having a sufficient mechanical strength. Further, poly(vinyl trimethyl silane) resins have an oxygen permeability coefficient of about $4.5 \times 10^{-9}$ in the same unit as above and attempts have been made to prepare an oxygen permeable element by supporting a membrane thereof on a porous supporting film or by shaping the resin into a self-supporting thin film although no attempts have been fully successful because the resins of this type hardly have a degree of polymerization sufficiently large to impart the films shaped thereof with a satisfactorily high mechanical strength.

On the other hand, it is reported in Polymer Preprints, volume 32 (10), page 2981 (1983) that a poly(1-trimethylsilyl-1-propyne) composed of the recurring monomeric units of the formula —C(Me)=C(—SiMe$_3$)—, in which Me is a methyl group, and prepared by the method described in Polymer Preprints, volume 31 (6), page 1189 (1982), Polymer Preprints, volume 32 (2), page 181 (1983), ibid. (6), page 1171 and ibid. (6), page 1175 has a very large gas permeability. This polymer has an oxygen permeability coefficient as large as $7.5 \times 10^{-7}$ in the same unit as above but the separation factor, i.e. the ratio of the permeability coefficients, thereof between oxygen and nitrogen is about 1.5. Although the mechanical strength of this polymer is considerably large and sufficiently thin films can be shaped thereof, the above mentioned separation factor between oxygen and nitrogen is too small to be satisfactory for the application of the polymer film when it is used as such for the separation or enrichment of oxygen from or in air.

SUMMARY OF THE INVENTION

It is therefore an object of the present invention to provide a novel polymeric material having a very large gas permeability and a high mechanical strength.

Another object of the invention is to provide the above mentioned poly(1-trimethylsilyl-1-propyne) with a remarkably increased separation factor between oxygen and nitrogen without decreasing the relatively large gas permeability and high mechanical strength of this polymer.

Thus, the novel polymeric material of the invention capable of satisfying the above mentioned objects of the invention is a substituted polyacetylene copolymer having a number-average molecular weight of $1 \times 10^4$ to $5 \times 10^6$ and composed of two types of the recurring monomeric units, of which the first type of the units is expressed by the formula

—C(—Me)=C(—SiMe$_3$)—     (I)

and the second type of the units is expressed by the formula

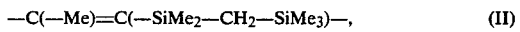

—C(—Me)=C(—SiMe$_2$—CH$_2$—SiMe$_3$)—,     (II)

in which Me is a methyl group, the molar ratio of the first type of the monomeric units (I) to the second type of the monomeric units (II) being in the range from 30:70 to 95:5.

DETAILED DESCRIPTION OF THE PREFERRED EMBODIMENTS

Figure 1:
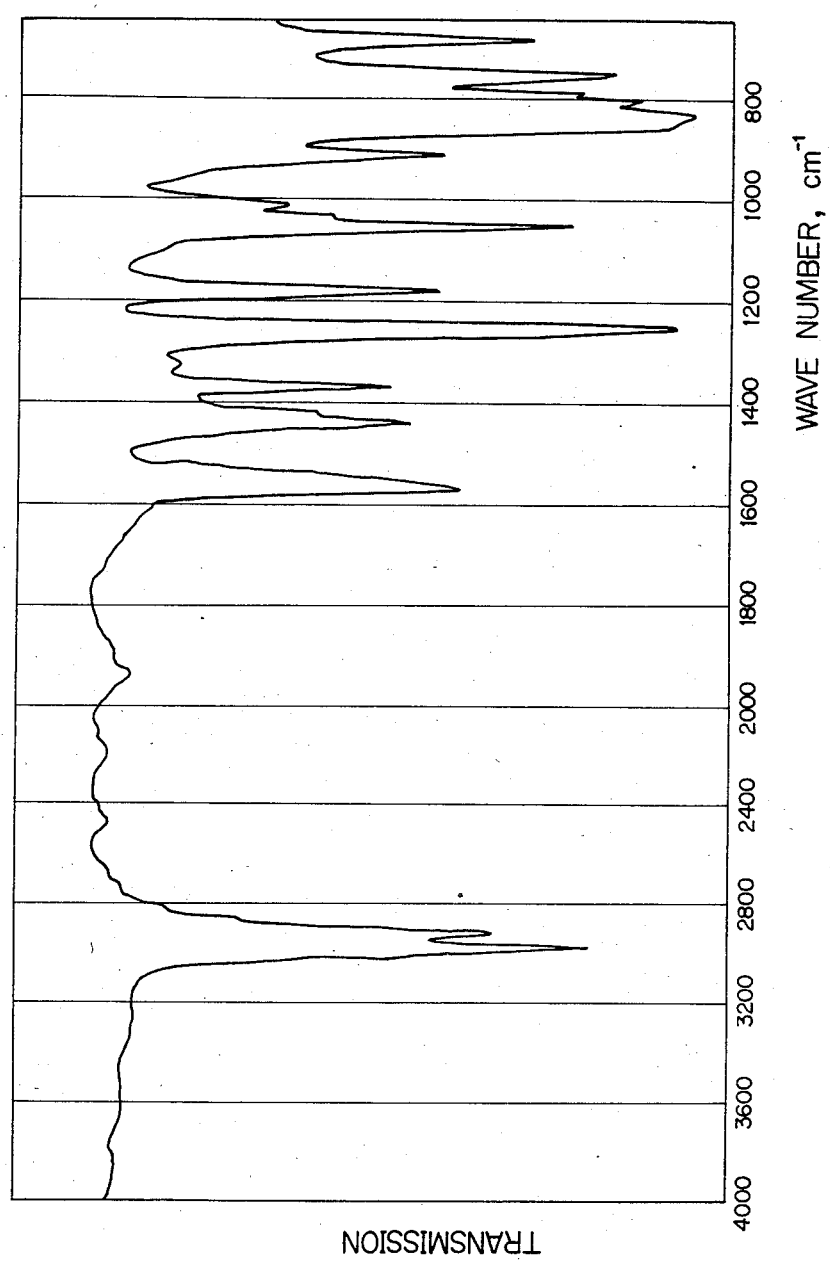
FIGS. 1 and 2 are each an infrared absorption spectrum of the copolymer prepared in Example 1 and of the homopolymer prepared in Comparative Example, respectively.

The above defined substituted polyacetylene copolymer of the invention has an outstandingly large oxygen permeability coefficient along with a sufficiently large separation factor between oxygen and nitrogen and is readily shapeable into a thin film having a high mechanical strength.

The substituted polyacetylene copolymer of the invention can be prepared by the copolymerization of two kinds of acetylene derivatives of which one is 1-trimethylsilyl-1-propyne expressed by the structural formula Me—C≡C—SiMe$_3$ and the other is 1-(1',1',3',3'-tetramethyl-1',3'-disilabutyl)-1-propyne expressed by the structural formula Me—C≡C—SiMe$_2$—CH$_2$—SiMe$_3$, in which Me is a methyl group. The copolymerization of these acetylenic monomers is performed in an organic solvent such as toluene, cyclohexane and the like at a temperature in the range from 30° to 130° C. in the presence of a polymerization catalyst such as tungsten hexachloride WCl$_6$, niobium pentachloride NbCl$_5$, tantalum pentachloride TaCl$_5$ and the like. The copolymer formed in the solution can be purified and isolated by precipitating with addition of a non-solvent of the copolymer such as methyl alcohol.

In connection with the molar ratio of the comonomers in the copolymerization, it is preferable that the molar ratio of the first acetylenic monomer leading to the monomeric units of the formula (I) to the second leading to the monomeric units of the formula (II) is in the range from 30:70 to 95:5 in order that the resultant copolymer has an oxygen permeability coefficient of at least $5 \times 10^{-8}$ in the above mentioned unit and a separation factor of at least 2.0 between oxygen and nitrogen. When the molar proportion of the monomeric units of the formula (I) is smaller than the above range in the copolymer, the oxygen permeability coefficient of the copolymer is disadvantageously decreased although the separation factor between oxygen and nitrogen is increased. When the molar proportion of the monomeric units of the formula (II) is smaller than the above range, on the other hand, the separation factor of the copolymer between oxygen and nitrogen is unduly low although an increase is obtained in the oxygen permeability coefficient. Further, films shaped of the copolymer have a sufficiently high mechanical strength when the copolymer has a number-average molecular weight in the range from $1 \times 10^4$ to $5 \times 10^6$ or, preferably, from $5 \times 10^4$ to $5 \times 10^6$.

The substituted polyacetylene copolymer of the invention is soluble in various organic solvents including hydrocarbon solvents such as benzene, toluene and hexane, halogenated hydrocarbon solvents such as chloroform, carbon tetrachloride and tetrachloroethylene, tetrahydrofuran and the like. The copolymer is shapeable into thin films and hollow fibers by the method of casting of an organic solution thereof or by wet or dry spinning. The films and fibers of the copolymer are excellent in the mechanical strengths and a tensile strength of 200 kg/cm² or higher can readily be obtained. These films and hollow fibers of the copolymer are quite satisfactory as an element for oxygen separation or enrichment from or in air by virtue of the large oxygen permeability coefficient of $5 \times 10^{-8}$ cm³(STP)·cm/cm²·sec·cmHg or larger and a separation factor of 2.0 or larger between oxygen and nitrogen.

In the following, examples are given to illustrate the method for the preparation of the inventive acetylenic copolymer and the performance thereof as an oxygen permeable material in more detail.

EXAMPLE 1

A polymerization mixture was prepared by adding 7.0 g (62.4 m moles) of 1-trimethylsilyl-1-propyne and 7.0 g (38.0 m moles) of 1-(1',1',3',3'-tetramethyl-1',3'-disilabutyl)-1-propyne into 80 g of toluene containing 500 mg of tantalum pentachloride dissolved therein and the polymerization mixture was heated at 80° C. for 3 hours to effect copolymerization of the acetylenic monomers. After the end of the above mentioned polymerization time, the mixture was diluted by adding 200 g of toluene and the solution was added dropwise into 1 liter of methyl alcohol to precipitate the copolymer which was collected by filtration and washed several times with methyl alcohol followed by drying to give 12.2 g of the copolymer product.

The number-average molecular weight of the copolymer was $6.5 \times 10^5$ as determined by the gel permeation chromatography with a tetrahydrofuran solution of the copolymer using a Model A-80M column manufactured by Showa Denko Co. and polystyrene as the reference material. FIG. 1 shows an infrared absorption spectrum of a film of the copolymer prepared by casting of a toluene solution thereof. Further, infrared absorption spectra were obtained for several fractions of the copolymer having different molecular weights prepared by the fractionating gel permeation chromatography and found to be substantially identical with each other. This fact supports that the here obtained polymeric product is a true copolymer of the two kinds of the acetylenic monomers. The elementary analysis of the copolymer gave values of 62.01% for carbon and 10.82% for hydrogen. This result supports that the molar proportion of the two types of the monomeric units of the formulas (I) and (II) in the copolymer is identical with that of the two kinds of the monomers used in the copolymerization.

The copolymer was shaped into a film having a thickness of 10 μm by the method of solution casting and the film was subjected to a tensile test according to the procedure specified in JIS K 7113-77 to give a tensile strength of 295 kg/cm². The permeation velocities of oxygen and nitrogen through the film were determined by the low-pressure method to give permeation coefficients of oxygen and nitrogen of $2.31 \times 10^{-7}$ and $9.09 \times 10^{-8}$, respectively, each in the same unit as above. The separation factor $PO_2/PN_2$ between oxygen and nitrogen was 2.54.

COMPARATIVE EXAMPLE

Figure 2:
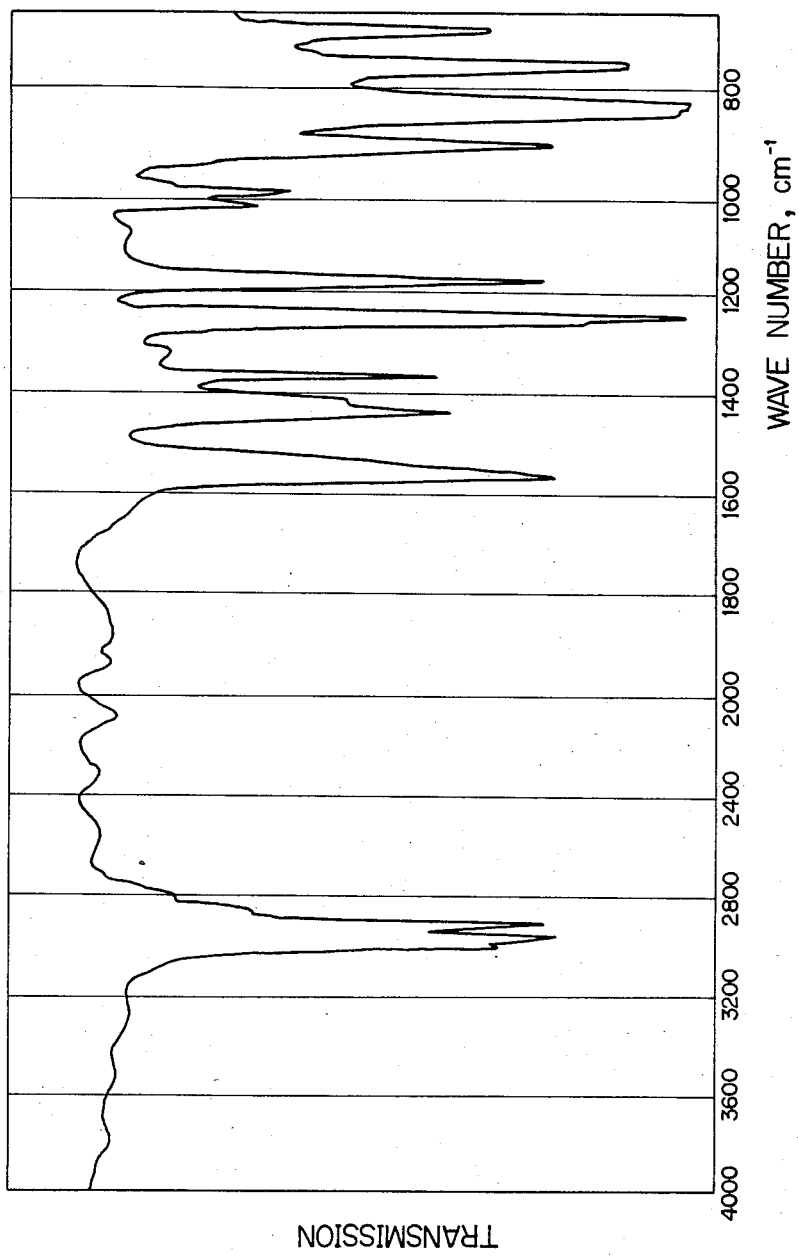

Homopolymerization of 1-trimethylsilyl-1-propyne alone was undertaken in substantially the same manner as in Example 1 to give a polymer composed of the recurring monomeric units of the formula (I) alone and having a number-average molecular weight of $6.2 \times 10^5$. The infrared absorption spectrum of a film of this polymer is shown in FIG. 2. A film of this polymer prepared by the method of solution casting and having a thickness of 11 μm had a tensile strength of 275 kg/cm².

The oxygen and nitrogen permeation coefficients $PO_2$ and $PN_2$ through this film were $7.15 \times 10^{-7}$ and $4.83 \times 10^{-7}$, respectively, to give a separation factor $PO_2/PN_2$ of 1.48 between oxygen and nitrogen.

EXAMPLE 2

Substantially the same polymerization procedure as in Example 1 was performed at 80° C. for 3 hours with a polymerization mixture prepared by adding 7.0 g (62.4 m moles) of 1-trimethylsilyl-1-propyne and 2.0 g (10.8 m moles) of 1-(1',1',3',3'-tetramethyl-1',3'-disilabutyl)-1-propyne into 50 g of toluene containing 300 mg of tantalum pentachloride dissolved therein. The resultant polymerization mixture was processed in the same manner as in Example 1 to give 8.2 g of a copolymer having a number-average molecular weight of $7.2 \times 10^5$. The tensile strength of a film of this copolymer prepared by casting of a solution and having a thickness of 12 μm was 308 kg/cm². The gas permeation test through this film gave results that the permeation coefficients of oxygen and nitrogen were $4.07 \times 10^{-7}$ and $1.91 \times 10^{-7}$, respectively, each in the same unit as above with a separation factor of 2.13 between oxygen and nitrogen.

EXAMPLE 3

Substantially the same polymerization procedure as in Example 1 was performed using 5.0 g (44.5 m moles) of 1-trimethylsilyl-1-propyne and 14.0 g (75.9 m moles) of 1-(1',1',3',3'-tetramethyl-1',3'-disilabutyl)-1-propyne to give 16.8 g of a copolymer having a number-average molecular weight of $3.8 \times 10^5$. A film of this copolymer prepared by casting of a solution and having a thickness of 10 μm had a tensile strength of 237 kg/cm² and the gas permeation test through this film gave results that the permeation coefficients of oxygen and nitrogen were $6.63 \times 10^{-8}$ and $2.23 \times 10^{-8}$, respectively, each in the same unit as above with a seperation factor of 2.97 between oxygen and nitrogen.

What is claimed is:

1. A substituted polyacetylene copolymer composed of two types of the recurring monomeric units, of which the first type of the monomeric units is expressed by the formula

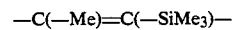

$-C(-Me)=C(-SiMe_3)-$ and the second type of the monomeric units is expressed by the formula —C(—Me)=C(—SiMe$_2$—CH$_2$—SiMe$_3$)—, in which Me is a methyl group, the molar ratio of the first type of the monomeric units to the second type of the monomeric units being in the range from 30:70 to 95:5.

2. The substituted polyacetylene copolymer as claimed in claim 1 which has a number-average molecular weight in the range from $1 \times 10^4$ to $5 \times 10^6$.

* * * * *